(12) United States Patent
Hsieh

(10) Patent No.: US 10,704,616 B2
(45) Date of Patent: Jul. 7, 2020

(54) ONE-WAY INERTIAL ROTATIONAL DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 94 days.

(21) Appl. No.: 16/007,972

(22) Filed: Jun. 13, 2018

(65) Prior Publication Data

US 2019/0162249 A1   May 30, 2019

(30) Foreign Application Priority Data

Nov. 24, 2017   (TW) .............................. 106141054 A

(51) Int. Cl.
| | |
|---|---|
| *F16D 41/12* | (2006.01) |
| *B25B 23/00* | (2006.01) |
| *B25B 23/14* | (2006.01) |
| *B25B 13/06* | (2006.01) |
| *B25B 21/02* | (2006.01) |
| *B25B 23/145* | (2006.01) |
| *F16D 41/18* | (2006.01) |

(52) U.S. Cl.
CPC .............. *F16D 41/12* (2013.01); *B25B 13/06* (2013.01); *B25B 23/0035* (2013.01); *B25B 23/1405* (2013.01); *B25B 21/02* (2013.01); *B25B 21/026* (2013.01); *B25B 23/1453* (2013.01); *F16D 41/18* (2013.01)

(58) Field of Classification Search
CPC ......... F16D 41/12; F16D 41/18; B25B 13/06; B25B 23/1405; B25B 23/0035; B25B 21/02; B25B 23/1453; B25B 21/026
See application file for complete search history.

(56) References Cited

U.S. PATENT DOCUMENTS

| | | | | |
|---|---|---|---|---|
| 3,200,918 A | * | 8/1965 | Horn ....................... | F16D 41/12 192/46 |
| 9,186,781 B2 | * | 11/2015 | Wang ..................... | B25B 13/463 |
| 2013/0113263 A1 | * | 5/2013 | Yamada ................... | B60N 2/02 297/423.19 |
| 2014/0131157 A1 | * | 5/2014 | Chih ....................... | F16D 41/12 192/44 |

(Continued)

*Primary Examiner* — David J Hlavka
(74) *Attorney, Agent, or Firm* — Guice Patents PLLC

(57) ABSTRACT

A one-way inertial rotational device includes: a rotary seat; an inertial member pivotally rotatably disposed on the circumference of the rotary seat via a pivot hole, a circumference of the rotary seat and a hole wall of the pivot hole of the inertial member being defined as a first circumferential face and a second circumferential face; and a one-way transmission mechanism having at least one one-way transmission tooth, at least one elastic member and multiple engagement teeth. The engagement teeth are annularly disposed on the second circumferential face. The transmission tooth is displaceably disposed on the first circumferential face. The elastic member keeps the transmission tooth engaged with the engagement teeth. Each engagement tooth has a tooth crest and a tooth height. The width of the tooth crest is larger than the tooth height so that the loss of the rotational energy is reduced to achieve greater rotational torque.

18 Claims, 11 Drawing Sheets

(56) References Cited

U.S. PATENT DOCUMENTS

| | | | |
|---|---|---|---|
| 2015/0035283 A1* | 2/2015 | Lee | F03B 13/1885 |
| | | | 290/53 |
| 2015/0053523 A1* | 2/2015 | Lim | B60B 27/047 |
| | | | 192/45.001 |
| 2016/0265603 A1* | 9/2016 | Sawicki | F16D 41/06 |

* cited by examiner

ONE-WAY INERTIAL ROTATIONAL DEVICE

BACKGROUND OF THE INVENTION

1. Field of the Invention

The present invention relates generally to a rotational drive device for providing rotational torque, and more particularly to a one-way transmission inertial rotational device, in which the loss of rotational dynamic energy is reduced.

2. Description of the Related Art

It is known that bolts, nuts and the like threaded members are used to connect articles. In order to enhance the operation efficiency, a power tool (such as a pneumatic wrench) is often used in cooperation with a rotary device such as a commonly seen socket to rotationally drive the threaded member. In order to enhance the torque of the power tool and the socket to tighten or untighten the threaded member, an inertial member with larger outer diameter is conventionally fitted on the outer circumference of the socket. For example, US patent publication No. US2012/0255749A1 "rotary impact device" discloses an inertial member fitted on the socket. By means of the moment of inertia of the inertial member, the rotational torque of the socket is enhanced.

In the above US patent, the inertial member is disposed on the socket. Such design can truly enhance the rotational torque of the power tool for rotationally driving the threaded member. However, the integrated structure of the inertial member and the socket is inapplicable to some use situations. FIG. 1 shows another type of conventional inertial rotational device including a rotary seat 11, multiple rotary tooth members 12 and multiple elastic members 13 respectively mounted in multiple retaining sockets 111 of the rotary seat 11. An inertial member 15 has a pivot hole 16 and is pivotally rotatably disposed on the rotary seat 11 via the pivot hole 16. The hole wall of the pivot hole 16 is formed with multiple one-way ratchets 17. The rotary tooth members 12 are elastically pushed by the elastic members 13 to outward swing, whereby the tooth sections 121 at front ends of the rotary tooth members 12 are engaged with the ratchets 17. The inertial member 15 is one-way pivotally rotatably disposed on the rotary seat 11.

A power output shaft 19 of a pneumatic tool is fitted with the rotary seat 11 to rotationally drive the rotary seat 11 for rotating a threaded member. For example, the rotary seat 11 is driven by the pneumatic tool to rotate in a direction R to transmit the action force as shown in the drawing. At the beginning, the rotational torque of the pneumatic tool is hard to successfully drive the threaded member. At this time, the output shaft 19 of the pneumatic tool intermittently outputs power to drive the rotary seat 11 until the threaded member is successfully rotated. When the output shaft 19 intermittently outputs power, the output shaft 19 applies a rotational torque to the rotary seat 11 and then releases the rotary seat 11 from the rotational torque. The two travels are repeatedly performed. In the process that the output shaft 19 intermittently rotationally drives the rotary seat 11, when the power of the output shaft 19 impacts the rotary seat 11 (the impact travel), the rotary seat 11 is step-by-step rotated in the direction R by a short distance. After the output shaft 19 releases power (the release travel), the rotary seat 11 will wait for the next impact travel of the output shaft 19 to be driven by the output shaft 19. Therefore, in each process that the output shaft 19 intermittently outputs power, the rotary seat 11 has dynamic energy for rotating the rotary seat 11 in the direction R many times.

In the impact travel, the rotary seat 11 will transmit the rotational dynamic energy to the inertial member 15 via the rotary tooth members 12. Due to the inertia, the inertial member 15 is not synchronously rotated with the rotary seat 11. The inertial member 15 applies a reaction force to the rotary tooth members 12. Each rotary tooth member 12 is pressed by a ratchet to move into the retaining socket 111, whereby the elastic member 13 stores elastic energy. When the step-by-step moving distance of the rotary seat 12 is such that the respective rotary tooth member 12 passes over a ratchet 17, the rotary tooth member 12 is pushed by the elastic force of the elastic member 13 to move into the next tooth space 18 and skip one time.

When the rotary seat 11 is driven by the output shaft 19 in the next impact travel, the moment of inertia G of the (previously driven) inertial member 15 in the direction R will be transmitted through the rotary tooth member 12 to the rotary seat 11 so as to enhance the torque of the rotary seat 11 for rotating the threaded member.

By means of the moment of inertia of the inertial member 15, the rotational tightening device 10 is able to increase the torque of the rotary seat 11 in the impact travel. However, it is found that the aforesaid rotational tightening device 10 still has some shortcomings.

As aforesaid, when the rotary seat 11 is rotated in the direction R and the inertial member 15 is not yet synchronously rotated with the rotary seat 11, the rotary tooth member 12 will skip (move out of a tooth space 18 and then move into the next tooth space 18). In the prior art, the width D of the tooth crest of the conventional ratchet 17 is quite small so that the distance between the adjacent tooth spaces 18 is quite small. Therefore, during the operation, the rotary tooth member 12 will frequently skip many times. Under such circumstance, the elastic members 13 will increase the loss of the moment of inertia of the inertial member 15 and the dynamic energy of the rotary seat 11. This will affect the torque of the tightening device 10 and needs to be improved.

SUMMARY OF THE INVENTION

It is therefore a primary object of the present invention to provide a one-way inertial rotational device the loss of the rotational energy of which is reduced.

To achieve the above and other objects, the one-way inertial rotational device of the present invention includes:

a rotary seat having a circumference, the rotary seat being drivable;

an inertial member having a pivot hole, the inertial member being pivotally disposed on the circumference of the rotary seat via the pivot hole, whereby the inertial member is rotatable around the rotary seat, the circumference of the rotary seat and a hole wall of the pivot hole of the inertial member being defined as a first circumferential face and a second circumferential face corresponding to each other; and a one-way transmission mechanism having at least one one-way transmission tooth, at least one elastic member and multiple engagement teeth. The engagement teeth are annularly disposed on the second circumferential face at equal intervals. The transmission tooth is disposed on the first circumferential face and displaceable to engage with or disengage from the engagement teeth, The elastic member serves to apply elastic energy to the transmission tooth for making the transmission tooth move toward the engagement teeth.

Each engagement tooth has a tooth crest and a tooth height. A width of the tooth crest is larger than the tooth height.

Preferably, the width of the tooth crest of each engagement tooth is 1.4 to 3.5 times the tooth height.

A tooth space is defined between each two adjacent engagement teeth. Preferably, the width of the tooth crest of each engagement tooth is larger than the width of the tooth space.

According to the above arrangement, when the rotary seat is rotated in a direction, the rotary seat drives the inertial member to rotate via the one-way transmission mechanism. During the rotational stroke, the number of times of engagement and disengagement between the transmission tooth and the engagement teeth is reduced. Therefore, the rotational dynamic energy of the rotary seat and the inertial dynamic energy of the inertial member that are absorbed by the elastic members are lowered. This can reduce the loss of the dynamic energy so that the rotational device can provide full energy to achieve higher rotational speed and the inertial member can have higher moment of inertia to provide greater rotational torque for driving the threaded member.

The present invention can be best understood through the following description and accompanying drawings, wherein:

DETAILED DESCRIPTION OF THE PREFERRED EMBODIMENTS

Figure 2:
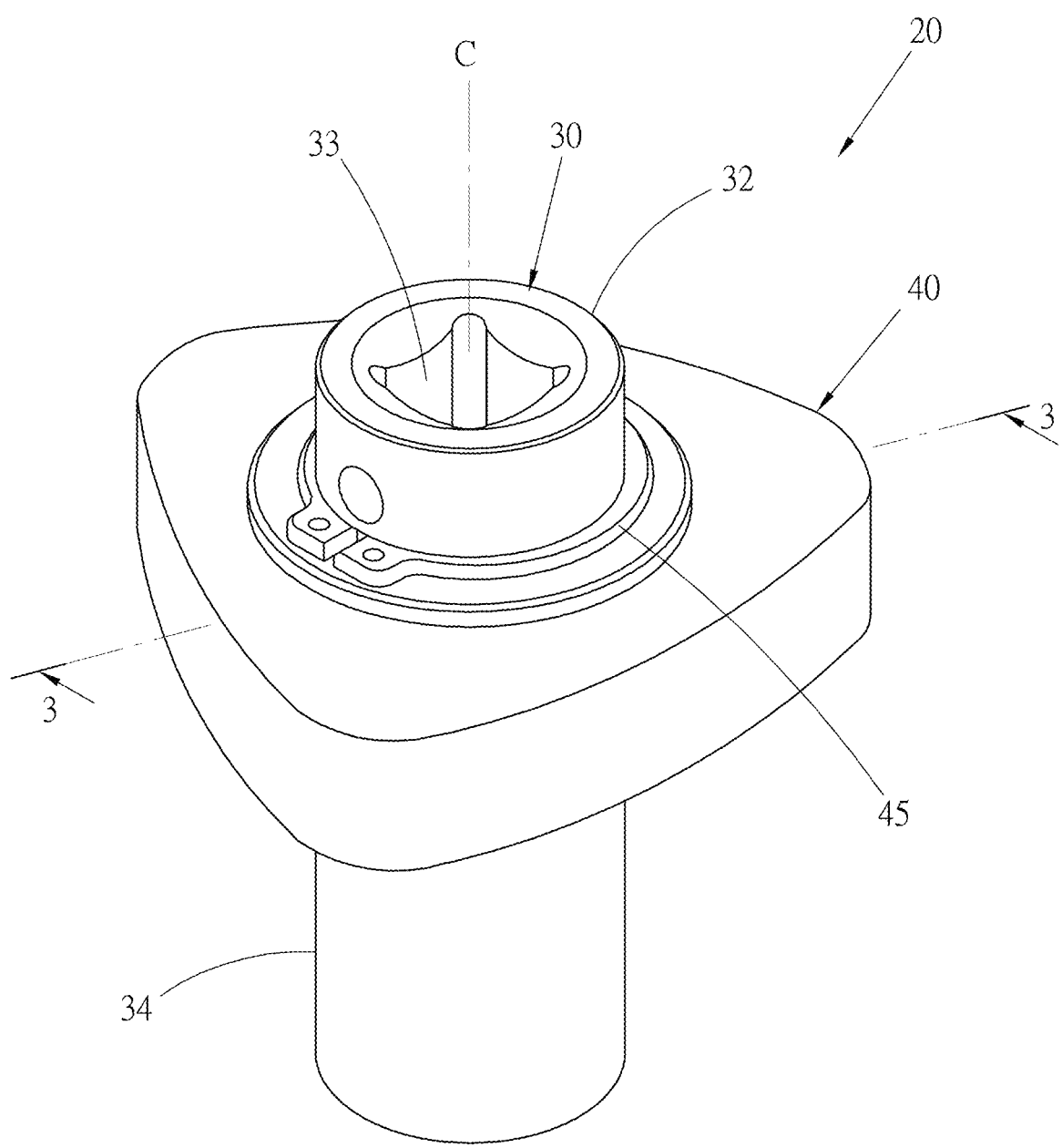
FIG. 2 is a perspective view of a first embodiment of the inertial rotational device of the present invention.
Figure 3:
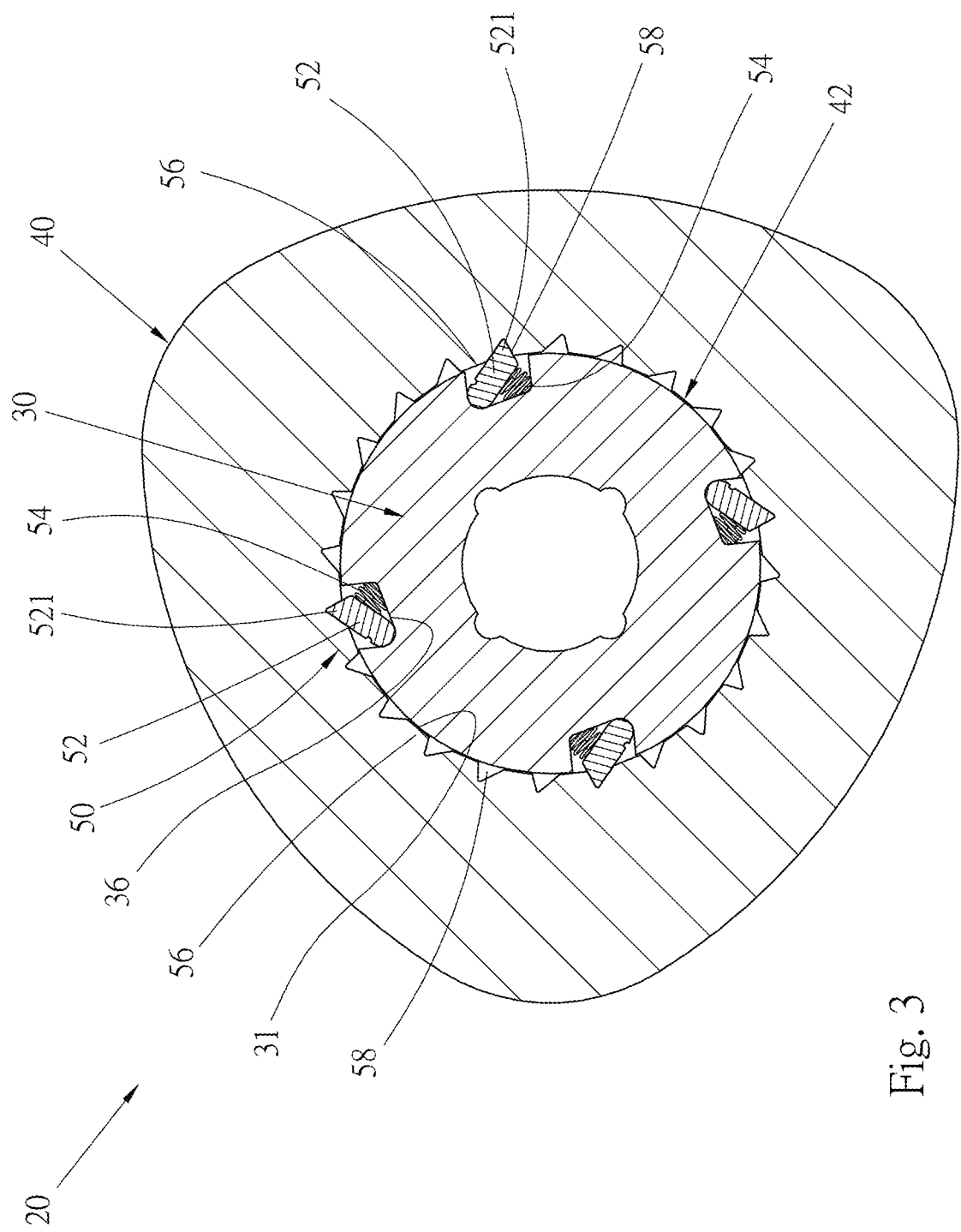
FIG. 3 is a sectional view taken along line 3-3 of FIG. 2.

Please refer to FIGS. 2 and 3. According to a first embodiment, the one-way inertial rotational device 20 of the present invention is, but not limited to, a socket for illustration purposes. In practice, the one-way inertial rotational device 20 of the present invention can be any device or article that can transmit torque by way of rotation. The one-way inertial rotational device 20 of the present invention includes a rotary seat 30, an inertial member 40 and a one-way transmission mechanism 50 disposed between the rotary seat 30 and the inertial member 40.

As aforesaid, in this embodiment, the one-way inertial rotational device 20 of the present invention is a socket. In this embodiment, the rotary seat 30 has a cylindrical configuration. A linking end 32 and a drive end 34 are respectively disposed at two ends of the rotary seat 30 to transmit action force. The linking end 32 is formed with a polygonal (such as quadrangular) connection hole 33 for connecting with a drive shaft of a power tool. A polygonal (such as hexagonal or dodecagonal) socket (not shown) is formed at the drive end 34 for fitting with a threaded member. The rotary seat 30 has a central axis C. When rotationally driven, the rotary seat 30 is rotated around the central axis C.

The inertial member 40 has a symmetrical configuration. The mass center of the inertial member 40 is positioned at the center of the inertial member 40. The outer diameter of the inertial member 40 is larger than the rotary seat 30. For example, the inertial member 40 is, but not limited to, a disc-shaped or cylindrical body. A pivot hole 42 is axially formed at the center of the inertial member 40. Via the pivot hole 42, the inertial member 40 is pivotally disposed around a circumference 31 of the rotary seat 30 and rotatable relative to the rotary seat 30. The inertial member 40 is mounted on the rotary seat in a proper manner. For example, as shown in FIG. 2, the top face and bottom face of the inertial member 40 are located by means of an upper retainer member 45 and a lower retainer member (not shown). The mounting manner of the inertial member 40 is not the main subject of the present invention and thus will not be further described hereinafter.

The circumference 31 of the rotary seat 30 and the hole wall of the pivot hole 42 of the inertial member 40 form a first circumferential face and a second circumferential face correspondingly concentric with each other. The first and second circumferential faces are relative to each other. In the case that the first circumferential face is defined as the circumference 31 of the rotary seat 30, the second circumferential face is the hole wall of the pivot hole 42 of the inertial member 40. Reversely, in the case that the first circumferential face is defined as the hole wall of the pivot hole 42, the second circumferential face is the circumference 31 of the rotary seat 30.

The one-way transmission mechanism 50 includes at least one one-way transmission tooth, at least one elastic member 54 and multiple engagement teeth 56. The one-way transmission tooth and the elastic member 54 are mounted on the first circumferential face, while the engagement teeth 56 are made on the second circumferential face. In the case that the circumference 31 of the rotary seat 30 is defined as the first circumferential face and the hole wall of the pivot hole 42 of the inertial member 40 is defined as the second circumferential face, the one-way transmission tooth and the elastic member 54 are mounted on the circumference 31 of the rotary seat 30, while the engagement teeth 56 are disposed on the hole wall of the pivot hole 42. Reversely, in the case that the first circumferential face is defined as the hole wall of the pivot hole 42 of the inertial member 40 and the second circumferential face is the circumference 31 of the rotary seat 30, the one-way transmission tooth and the elastic member 54 are mounted on the hole wall of the pivot hole 42, while the engagement teeth 56 are disposed on the circumference 31 of the rotary seat 30.

Figure 4:
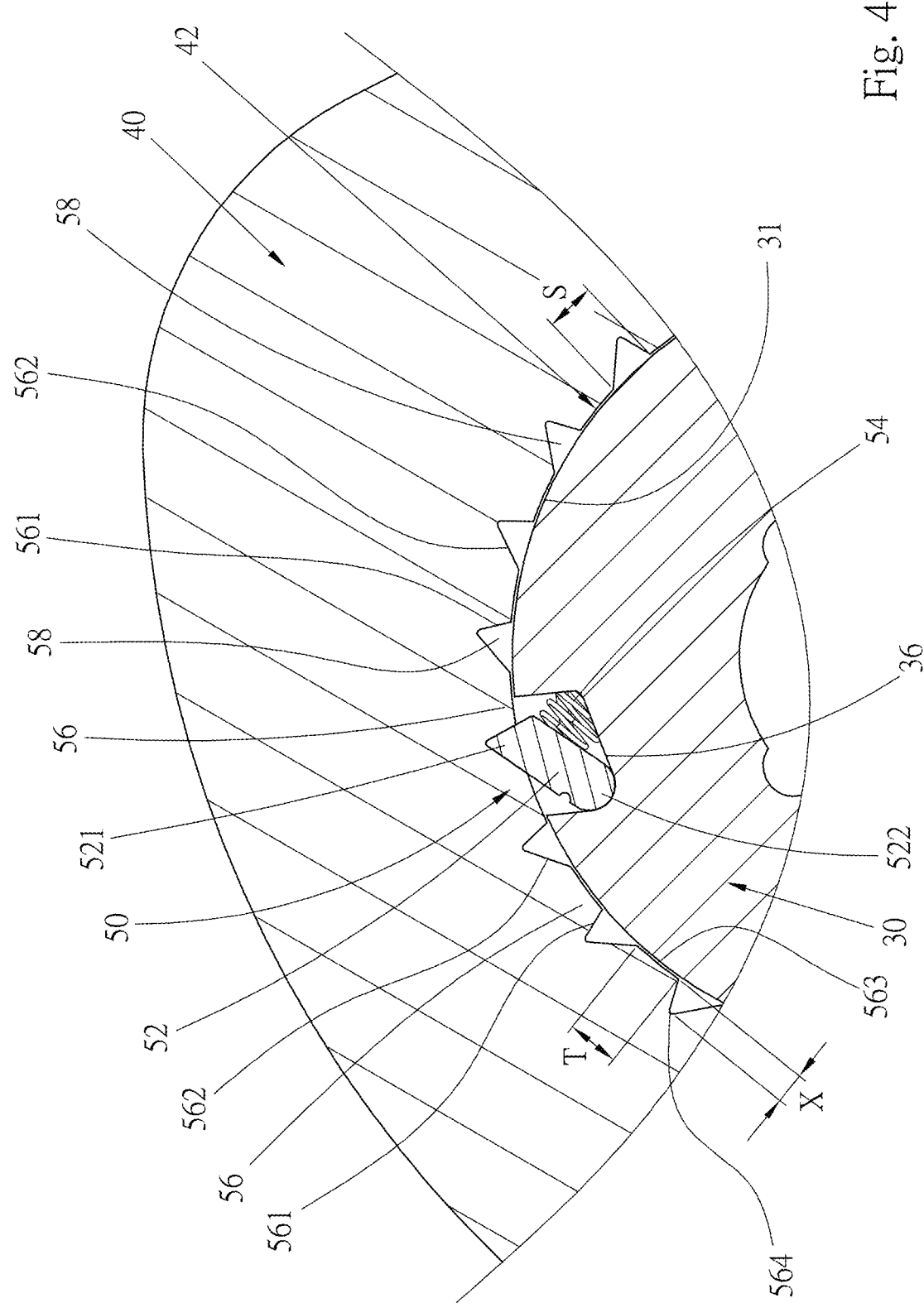
FIG. 4 is an enlarged view of a part of FIG. 3.

Please now refer to FIGS. 3 and 4. In this embodiment, the circumference 31 of the rotary seat 30 is the first circumferential face, while the hole wall of the pivot hole 42 of the inertial member 40 is the second circumferential face for illustration purposes. The circumference 31 (the first circumferential face) is formed with at least one recess 36 in which the one-way transmission tooth and the elastic member 54 are disposed. In this embodiment, there are multiple one-way transmission teeth and multiple elastic members 54 and multiple recesses 36. In this embodiment, each one-way transmission tooth is a rotary tooth member 52. The rotary tooth members 52 and the elastic members 54 are respectively disposed in the recesses 36. The engagement teeth 56 are annularly disposed on the hole wall of the pivot hole 42 (the second circumferential face) at equal intervals. A tooth space 58 is defined between each two adjacent engagement teeth 56.

One end of each rotary tooth member 52 is a tooth section 521. The other end of the rotary tooth member 52 is a pivoted end 522 disposed on one side of the recess 36. The rotary tooth member 52 is angularly displaceable with the pivoted end 522 serving as the rotational fulcrum. Each elastic member 54 is disposed on the other side of each recess 36. One end of the elastic member 54 elastically abuts against the rotary tooth member 52 to apply elastic force to the rotary tooth member 52 for keeping outward pushing the rotary tooth member 52. Accordingly, the tooth section 521 outward protrudes from the recess 36 to engage with the engagement tooth 56. As shown in the drawings, when the rotary tooth member 52 is engaged with the engagement tooth 56, the tooth section 521 of the rotary tooth member 52 is moved into the tooth space 58.

Figure 5:
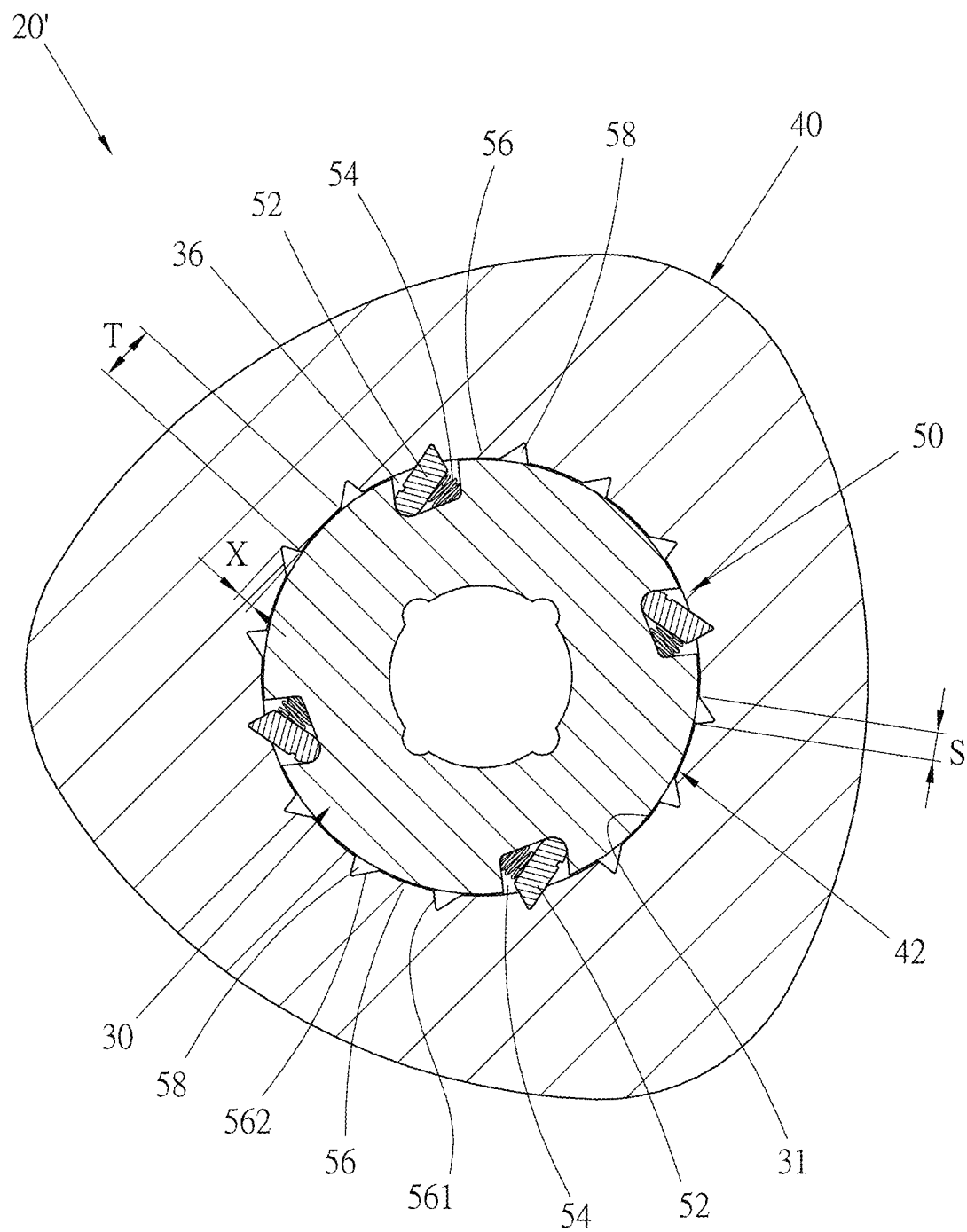
FIG. 5 is a sectional view of a second embodiment of the inertial rotational device of the present invention according to FIG. 3.

Two sides of each engagement tooth 56 are respectively a first tooth face 561 and a second tooth face 562. In addition, each engagement tooth 56 has a tooth crest 563. The slope of the first tooth face 561 is larger than the slope of the second tooth face 562. Please refer to FIG. 4. Each engagement tooth 56 has a height X (hereinafter referred to as tooth height) between the tooth crest 563 and a tooth trough 564. The tooth crest 563 of each engagement tooth 56 is formed with a width T (hereinafter referred to as tooth crest width). In the present invention, the tooth crest width T of the tooth crest 563 of the engagement tooth 56 is larger than the tooth height X. The tooth crest width T is 1.4 to 3.5 times the tooth height X and preferably 1.5 to 3.2 times the tooth height X. With respect to the first embodiment as shown in FIGS. 3 and 4, the tooth crest width T is 2.57 unit size, while the tooth height X is 1.6 unit size. By means of increasing the width of the tooth crest 56, the distance between two adjacent tooth spaces 58 is increased. Moreover, in the present invention, the tooth crest width T of the tooth crest 563 of the engagement tooth 56 is larger than the width S of the tooth space 58 as shown in FIG. 5. The width S is the distance between two adjacent tooth crests 563. The end face of the tooth crest 563 is an arched face.

Please now refer to FIG. 5, which is a sectional view of a second embodiment of the one-way inertial rotational device 20' of the present invention. The structures of all the components of this embodiment, including the rotary seat 30, the inertial member 40 and the one-way transmission mechanism 50 are identical to those of the first embodiment and thus will not be redundantly described hereinafter. The same components are denoted with the same reference numerals. In this embodiment, the tooth crest width T of the tooth crest 563 of the engagement tooth 56 is larger than the tooth crest width T of the first embodiment. In this embodiment, the tooth crest width T is 5.08 unit size, while the tooth height X is 1.6 unit size.

The one-way transmission mechanism 50 serves to make the rotary seat 30 and the inertial member 40 one-way transmit power. On the basis of the direction of FIG. 4, when the rotary seat 30 is clockwise rotated, the rotary tooth member 52 keeps engaging with the engagement tooth 56 of the inertial member 40. Therefore, the rotary seat 30 drives the inertial member 40 to clockwise synchronously rotate. In addition, when the rotary seat 30 stops clockwise rotating, the inertial member 40 will still clockwise rotates. At this time, the rotary tooth members 52 will skip and repeatedly move into and out of the tooth spaces 58. Therefore, the inertial member 40 will not transmit dynamic energy to the rotary seat. When the rotary seat 30 is counterclockwise rotated, at the beginning of the rotation, the inertial member 40 applies a reaction force to the rotary tooth member 52 to move into the recess 36 so that at the beginning of rotation, the rotary seat 30 cannot immediately drive the inertial member 40 to rotate.

The operation state that the inertial rotational device 20 of the present invention rotates a threaded member will be described hereinafter. Please refer to FIG. 6. In operation, the power output shaft 60 of a pneumatic wrench is connected at the connection hole 33 of the linking end 32 of the rotary seat 30. The drive end 34 of the rotary seat 30 is fitted with a threaded member. The output shaft 60 applies a rotational torque to the rotational device 20 in a direction R to rotate the threaded member as shown in the drawing. In the case that the rotary seat 30 is a driving member, while the inertial member 40 is a driven member, when the rotary seat 30 is rotated in the direction R, the direction R is the direction in which the rotary seat 30 and the inertial member 40 can be rotated relative to each other, that is, the rotary tooth members 52 will skip in this direction.

At the beginning, the rotational torque of the output shaft 60 is hard to successfully drive the threaded member and the rotary seat 30. At this time, the output shaft 60 intermittently outputs power to drive the rotary seat 30. The operation travels of the output shaft 60 that intermittently drives the rotary seat 30 include an impact travel in which the rotational torque is applied to the rotary seat 30 and a release travel in which the output shaft 60 releases the rotary seat 30 from the rotational torque. The output shaft 60 will repeat the two travels many times to act on the rotary seat 30 until the threaded member is successfully rotated. During the operation process, the dynamic energy of the rotary seat 30 will also drive the inertial member 40 to operate.

Figure 6:
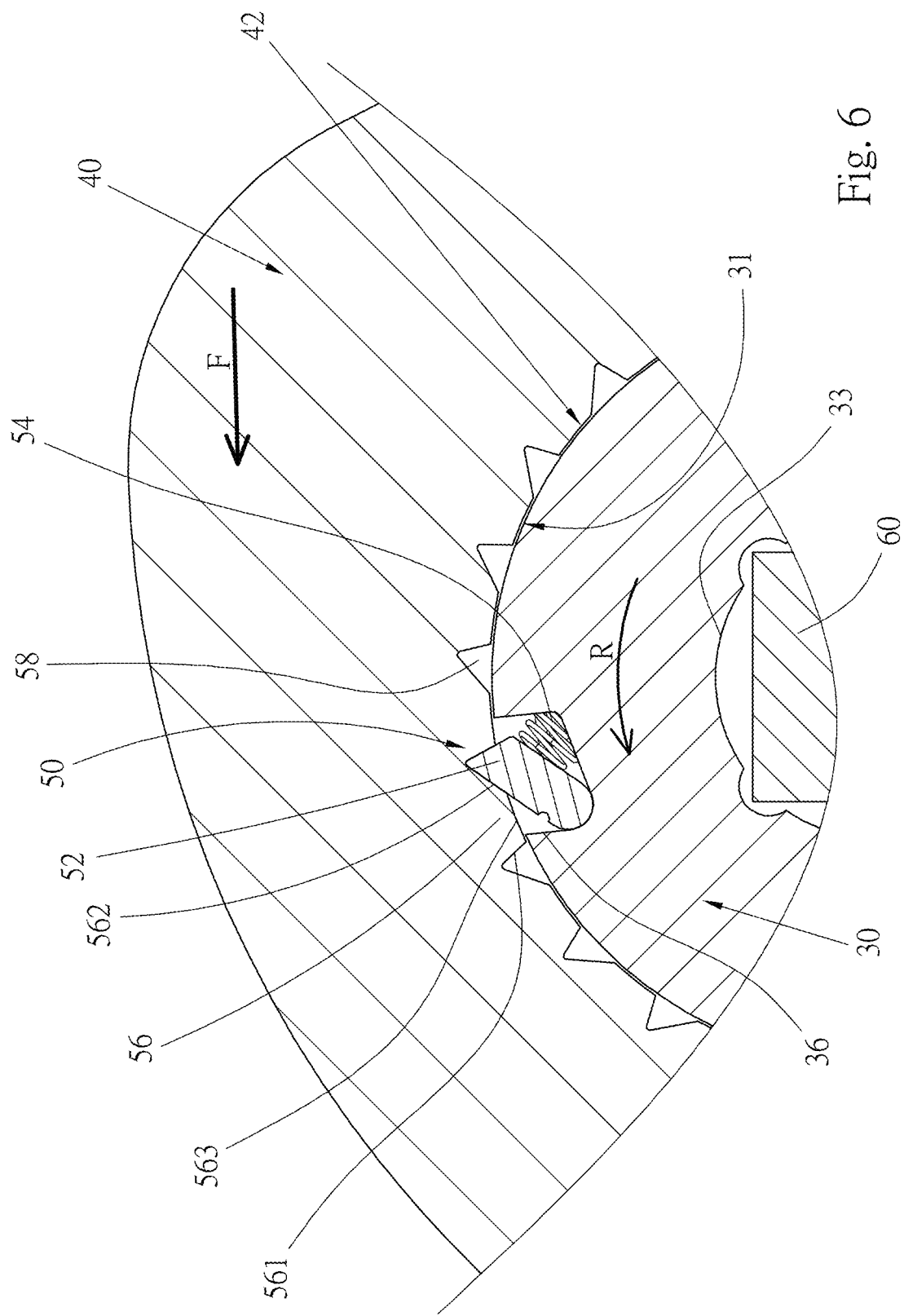
FIGS. 6 to 9 are operational views showing that the inertial rotational device of the present invention is rotated in a direction to transmit action force.
Figure 7:
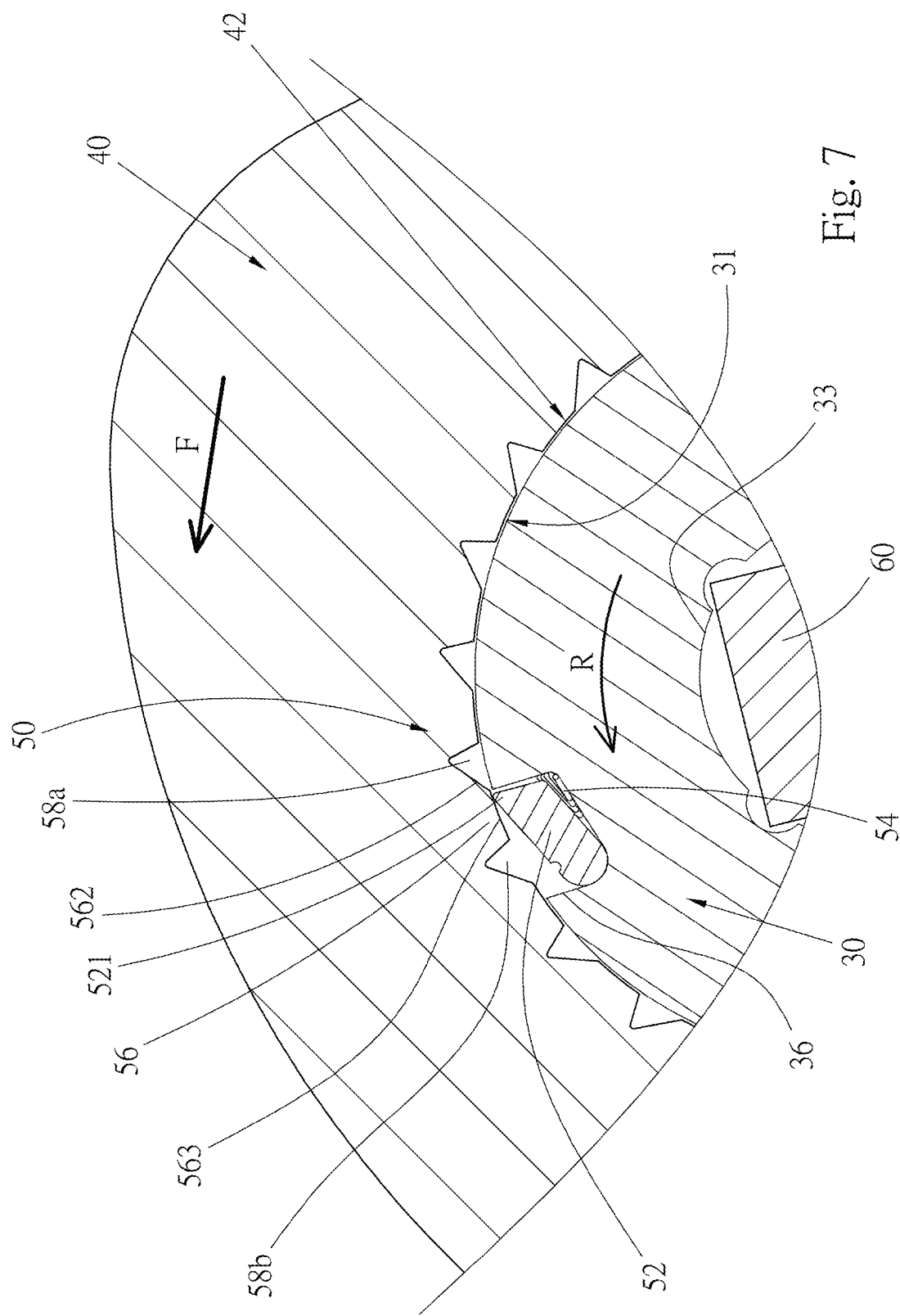

In the impact travel, when the rotary seat 30 is driven by the output shaft 60 to rotate, the rotational dynamic energy of the rotary seat 30 will be transmitted to the inertial member 40 via the rotary tooth members 52. When the rotary seat 30 is initially rotated, due to inertia, the inertial member 40 will not immediately rotate with the rotary seat 30. The second tooth face 562 of one engagement tooth 56 of the inertial member 40 will apply a reaction force to the rotary tooth member 52, whereby the rotary tooth member 52 is pressed to angularly displace and move into the recess 36 as shown in FIG. 7. At this time, the elastic member 54 is compressed to store elastic energy. The inertial member 40 is not immediately rotated with the rotary seat 30. However, the inertial member 40 has been driven by the dynamic energy of the rotary seat 30. The action force F of FIG. 6 represents the action force of the dynamic energy of the rotary seat 30 that drives the rotary seat 30 to rotate.

Figure 1:
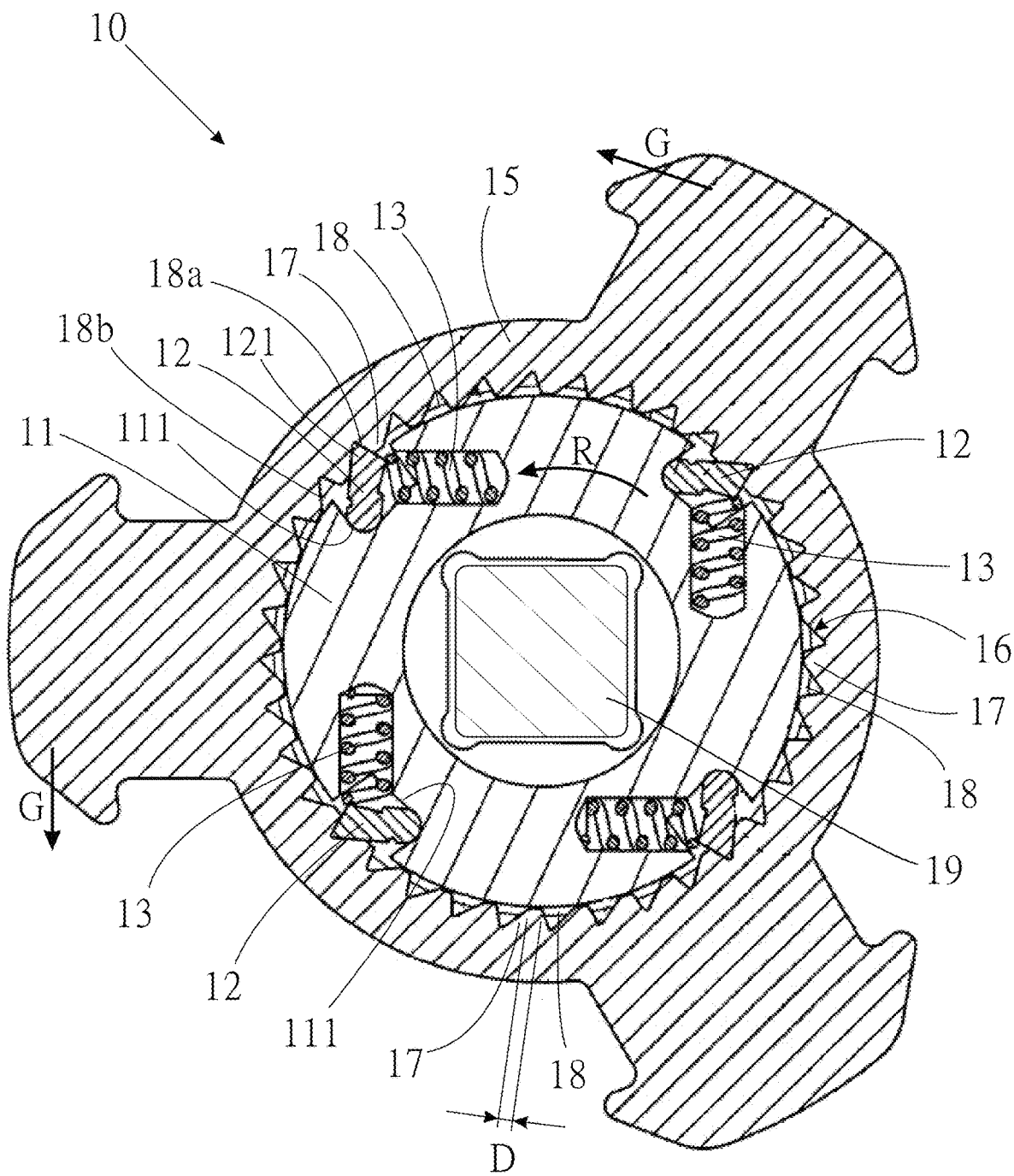
FIG. 1 is a sectional view of a conventional inertial rotational device.
Figure 8:
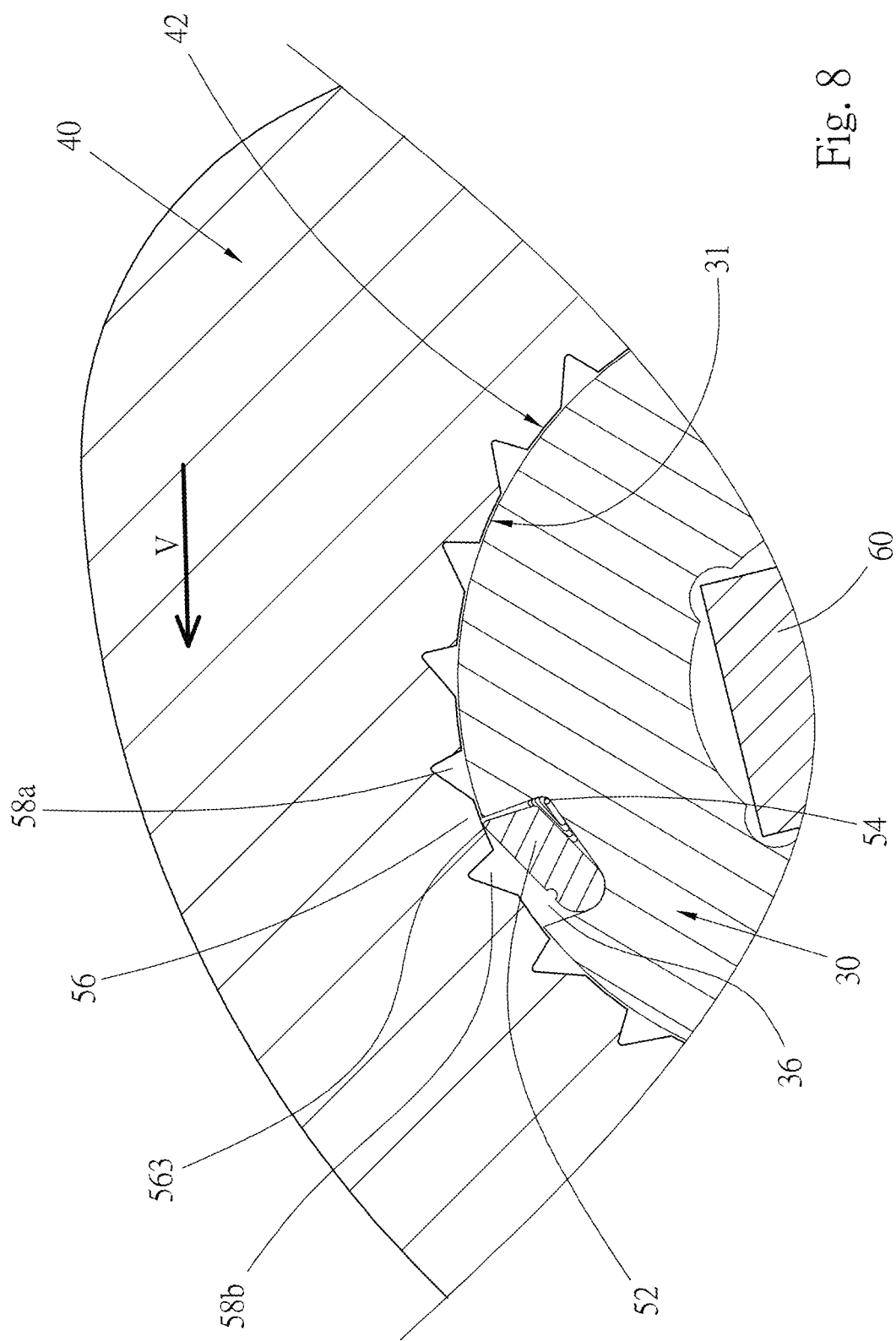

In the impact stroke that the power of the output shaft 60 drives the rotary seat 30, the rotary seat 30 is step rotated in the direction R by a short distance from the position of FIG. 7 to the position of FIG. 8, where the tooth section 521 of the rotary tooth member 52 is still in contact with the end face of the tooth crest 563 of the engagement tooth 56. In the present invention, the tooth crest width T is larger than the tooth height X so that in the operation state as shown in FIG. 8, the rotary tooth member 52 still keeps in contact with the tooth crest 563 of the engagement tooth 56 without skipping into the next tooth space 58b. (In case of the prior art as shown in FIG. 1, the rotary tooth member 12 will have already skipped from the original tooth space 18a into the next tooth space 18b).

Figure 9:
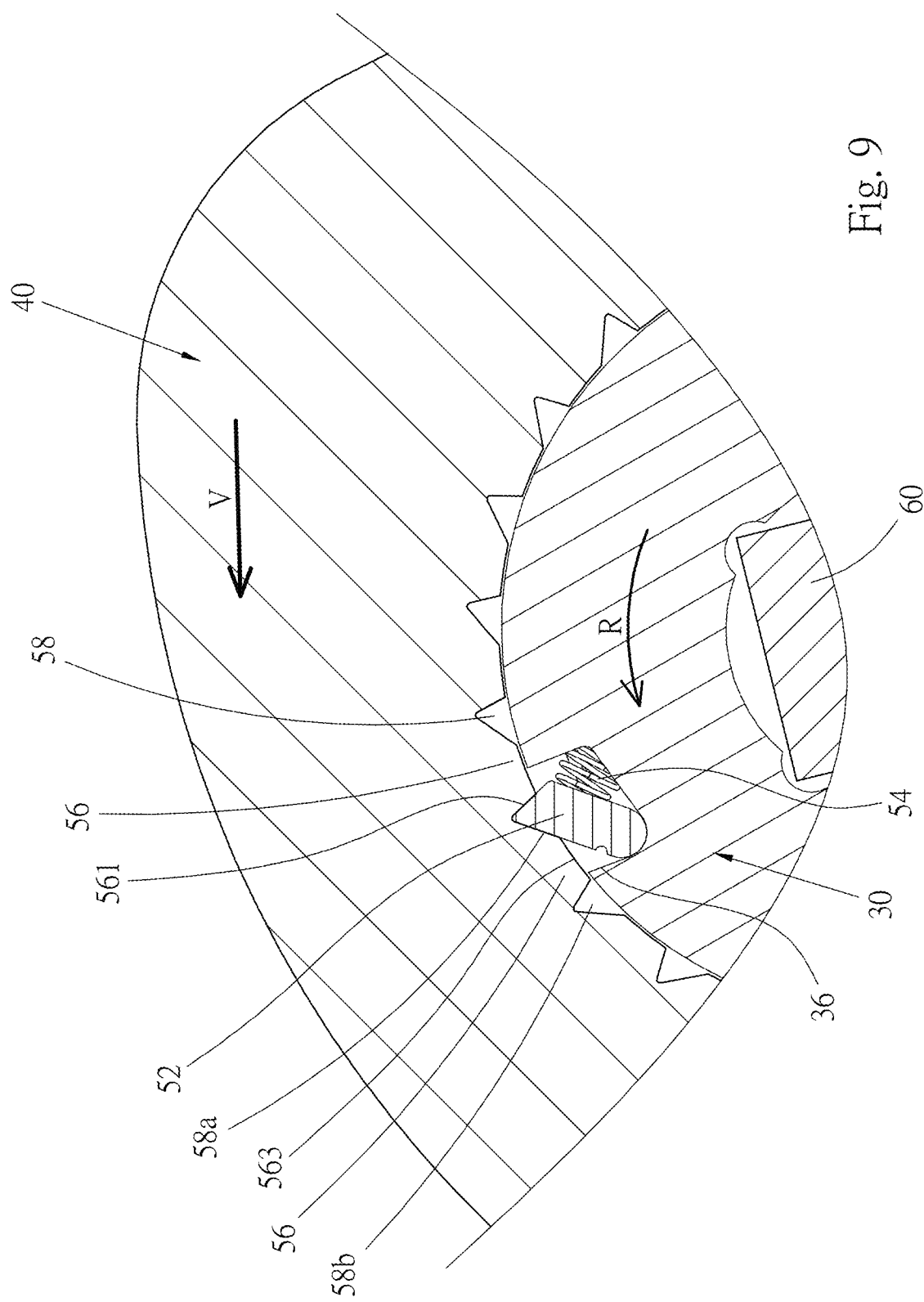

When the impact stroke of the output shaft 60 ends, the release stroke starts. At this time, the output shaft 60 and the rotary seat 30 have no rotational dynamic energy. It is necessary to wait for the next impact stroke for the output shaft 60 to drive the rotary seat 30 again. Please refer to FIG. 8. In the release travel, under the aforesaid action force F, the inertial member 40 will have moment of inertia V to rotate in the direction R. By means of the design of the wider tooth crest 563, the rotational distance of the inertial member 40 on the respective tooth crests 563 is enlarged to create greater dynamic energy. At this time, the inertial member 40 rotates in the direction R. When a tooth space 58 of the inertial member 40 is aligned with the rotary tooth member 52, the elastic member 54 will elastically push the rotary tooth member 52 to make the same move into the tooth space 58 as shown in FIG. 9. (In FIG. 9, the rotary tooth member 52 is again moved into the original tooth space 58a for illustration purposes).

In the state that the rotary tooth member 52 is moved into a tooth space 58 as shown in FIG. 9, when the next impact travel of the output shaft 60 starts, the output shaft 60 again drives the rotary seat 30 to rotate in the direction R. At the same time, the moment of inertia V of the inertial member 40 is transmitted to the rotary seat 30 in the same direction via the rotary tooth members 52 to drive the rotary seat 30 to rotate. Accordingly, in the impact travel that the rotational device 20 rotationally drives the threaded member, the moment of inertia V of the inertial member 40 is added to the rotary seat 30 for enhancing the rotational torque of the rotary seat 30 so that the threaded member can be more successfully, effectively and quickly rotated.

In comparison with the prior art, the inertial rotational device 20 of the present invention is advantageous over the prior art in that in the impact travel and the release travel, the inertial rotational device 20 of the present invention reduces the number of times of skipping of the rotary tooth member 52 into and out of the tooth spaces 58, therefore, the rotational dynamic energy of the rotary seat 30 and the inertial momentum of the inertial member 40 that are absorbed by the elastic members 54 are lowered. The present invention is such designed that the tooth crest width T of the engagement tooth 56 is larger than the tooth height X, therefore, during the relative rotation process of the rotary seat 30 and the inertial member 40, no matter whether the relative rotational distance is larger than the tooth distance of the engagement teeth 56, the possibility and time of staying of the tooth section 521 of the rotary tooth member 52 on the tooth crest 563 of the engagement tooth 56 can be increased to reduce the number of times of skipping of the rotary tooth member 52 between the tooth spaces 58. Therefore, in the present invention, the number of times of skipping of the rotary tooth member 52 is less than the conventional structure. This can reduce the loss of the inertial momentum of the inertial member 40 and the loss of the rotational dynamic energy of the rotary seat 30. In this case, in use, the inertial rotational device 20 of the present invention can create greater rotational torque.

Figure 10:
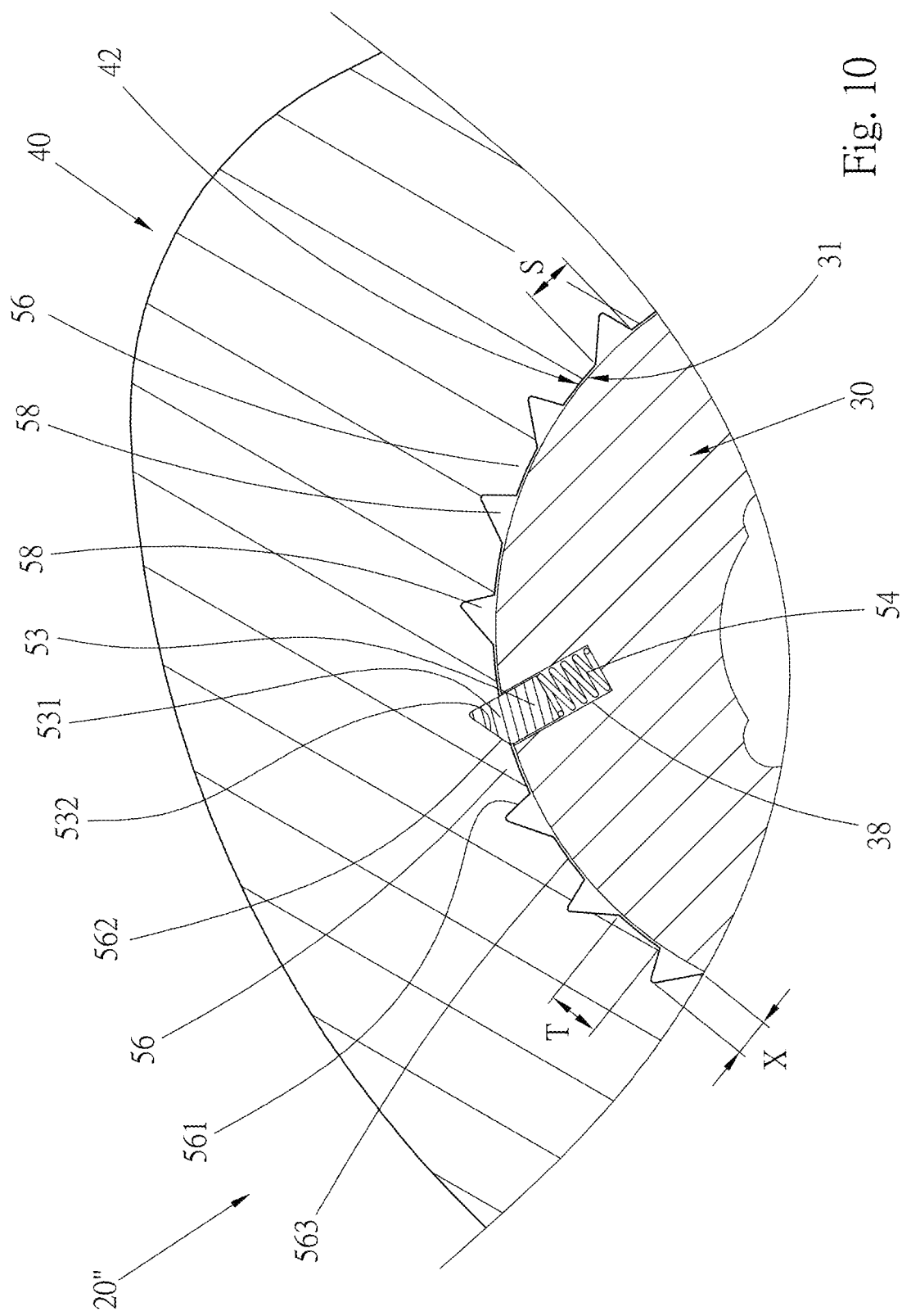
FIG. 10 is a partially sectional view of a third embodiment of the inertial rotational device of the present invention.

Please now refer to FIG. 10, which shows a third embodiment of the one-way inertial rotational device 20″ of the present invention. The same components are denoted with the same reference numerals and will not be redundantly described hereinafter. The third embodiment is different from the first embodiment in the form of the one-way transmission tooth. Several recesses 38 are disposed on the circumference of the rotary seat 30 (defined as the first circumferential face or the second circumferential face) at equal intervals. Several one-way transmission teeth are disposed in the recesses 38. In this embodiment, the transmission teeth are ratchet members 53. One end of the ratchet member 53 is a tooth section 531 and has a slope 532. The ratchet member 53 is movable within the recess 38. The elastic member 54 is disposed in the recess 38 to push the ratchet member 53 outward and make the tooth section 531 of the ratchet member 53 engaged with the engagement tooth 56. When engaged, the tooth section 531 of the ratchet member 53 is moved into a tooth space 58 with the slope 532 in contact with the second tooth face 562 of an engagement tooth 56.

The engagement tooth 56 of this embodiment is identical to the engagement tooth 56 of the first embodiment. The tooth crest width T of the tooth crest 563 of the engagement tooth 56 is larger than the tooth height X. The size of the tooth crest width T is 1.4 to 3.5 times the size of the tooth height X.

On the basis of the direction of FIG. 10, when the rotary seat 30 is clockwise rotated, the ratchet member 53 will not move into the recess 38, whereby the rotary seat 30 can drive the inertial member 40 to synchronously rotate.

Figure 11:
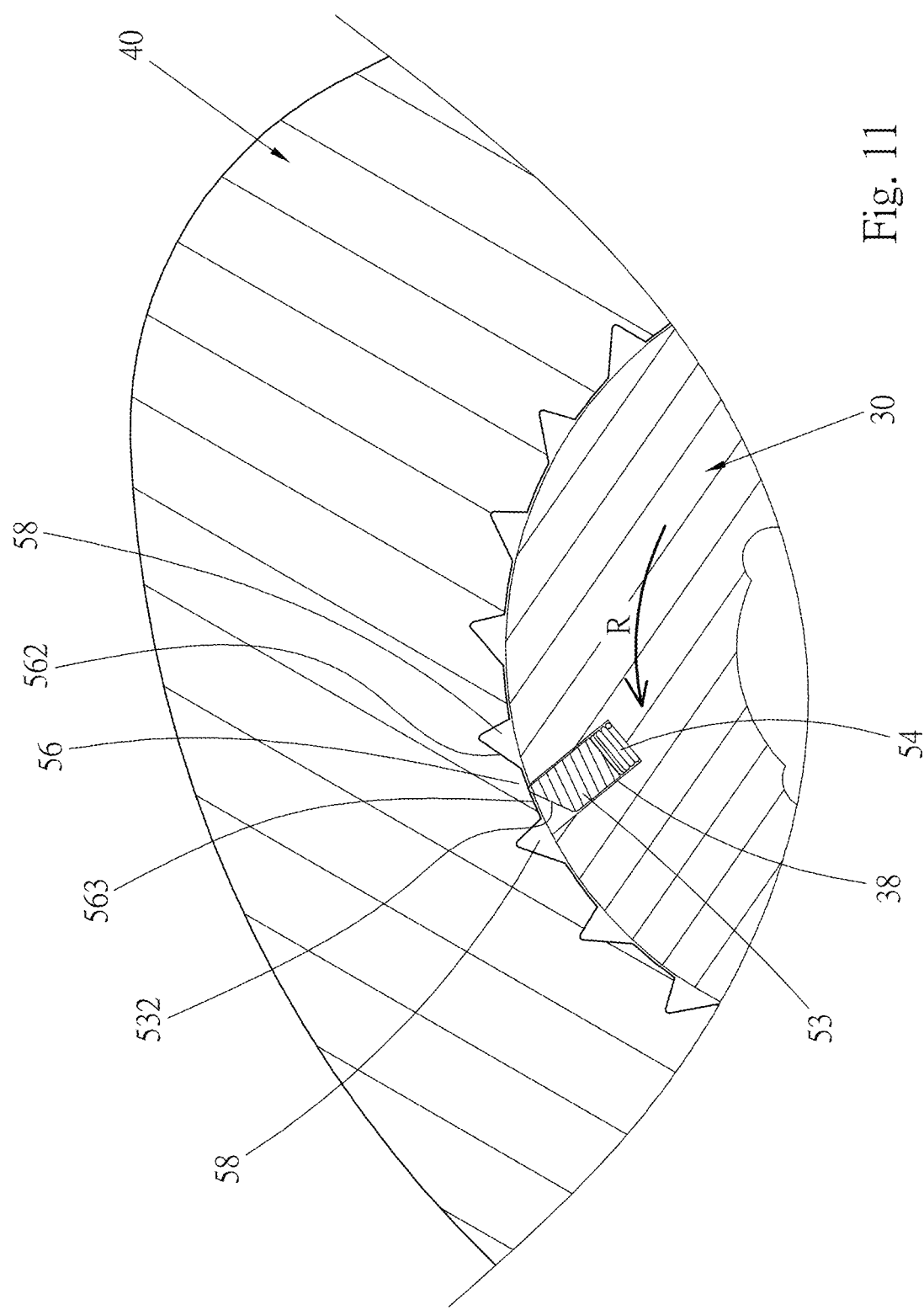
FIG. 11 is a sectional view according to FIG. 10, showing an operation state thereof.

On the basis of the direction of FIG. 11, when the rotary seat 30 is driven by the pneumatic tool to rotate counterclockwise in the direction R, due to the inertia of the inertial member 40, the second tooth face 562 of an engagement tooth 56 applies a reaction force to the slope 532 of each ratchet member 53 to make the ratchet member 53 move into the recess 38. Therefore, the ratchet member 53 will skip and repeatedly move into and out of the tooth space 58 and slide over the tooth crest 563 of the engagement tooth 56.

The usage of this embodiment is identical to that of the first embodiment and thus will not be redundantly described hereinafter.

The above embodiments are only used to illustrate the present invention, not intended to limit the scope thereof. Many modifications of the above embodiments can be made without departing from the spirit of the present invention. For example, in the above embodiments, the one-way transmission manner is that when the rotary seat is clockwise rotated (on the basis of the direction of the drawing), the rotary seat will drive the inertial member to rotate. In practice, the one-way transmission manner of the rotational device can be alternatively such designed that when the rotary seat is counterclockwise rotated, the rotary seat will drive the inertial member to rotate. Such modification is simply an option in practice.

What is claimed is:

1. A one-way inertial rotational device comprising:
a rotary seat having a circumference, the rotary seat being drivable;
an inertial member having a pivot hole, the inertial member being pivotally disposed on the circumference of the rotary seat via the pivot hole, whereby the inertial member is rotatable around the rotary seat;
the circumference of the rotary seat and a hole wall of the pivot hole of the inertial member being defined as a first circumferential face and a second circumferential face corresponding to each other;
a one-way transmission mechanism having at least one one-way transmission tooth, at least one elastic member and multiple engagement teeth, the engagement teeth being annularly disposed on the second circumferential face at equal intervals, the transmission tooth being disposed on the first circumferential face and displaceable to engage with or disengage from the engagement teeth, the elastic member being disposed on the first circumferential face to apply elastic energy to the transmission tooth for making the transmission tooth move toward the engagement teeth, whereby when the rotary seat is rotated in a direction, via the transmission tooth, the rotary seat drives the inertial member to rotate and when the rotary seat is rotated in another direction, the transmission tooth skips and slides over the engagement teeth; and each engagement tooth having a tooth crest and a tooth height, a width of each tooth crest being larger than each corresponding tooth height.

2. The one-way inertial rotational device as claimed in claim 1, wherein the width of each tooth crest is 1.4 to 3.5 times each corresponding tooth height.

3. The one-way inertial rotational device as claimed in claim 1, wherein a tooth space is defined between each two adjacent engagement teeth, the width of each tooth crest of each engagement tooth being larger than a width of each tooth space.

4. The one-way inertial rotational device as claimed in claim 1, wherein the tooth crest of each engagement tooth has an end face, each end face being an arched face.

5. The one-way inertial rotational device as claimed in claim 1, wherein the first circumferential face is the circumference of the rotary seat, while the second circumferential face is the hole wall of the pivot hole of the inertial member, or the first circumferential face is the hole wall of the pivot hole of the inertial member, while the second circumferential face is the circumference of the rotary seat.

6. The one-way inertial rotational device as claimed in claim 1, wherein two sides of each engagement tooth are respective a first tooth face and a second tooth face, the first and second tooth faces having different slopes.

7. The one-way inertial rotational device as claimed in claim 1, wherein at least one recess is disposed on the first circumferential face, the one-way transmission tooth being a rotary tooth member, the rotary tooth member being pivotally disposed in each corresponding recess, the rotary tooth member being swingable, whereby one end of the rotary tooth member can be engaged with or disengage from the engagement teeth, the elastic member being disposed in each recess.

8. The one-way inertial rotational device as claimed in claim 2, wherein at least one recess is disposed on the first circumferential face, the one-way transmission tooth being a rotary tooth member, the rotary tooth member being pivotally disposed in each corresponding recess, the rotary tooth member being swingable, whereby one end of the rotary tooth member can be engaged with or disengage from the engagement teeth, the elastic member being disposed in each recess.

9. The one-way inertial rotational device as claimed in claim 3, wherein at least one recess is disposed on the first circumferential face, the one-way transmission tooth being a rotary tooth member, the rotary tooth member being pivotally disposed in each corresponding recess, the rotary tooth member being swingable, whereby one end of the rotary tooth member can be engaged with or disengage from the engagement teeth, the elastic member being disposed in each recess.

10. The one-way inertial rotational device as claimed in claim 4, wherein at least one recess is disposed on the first circumferential face, the one-way transmission tooth being a rotary tooth member, the rotary tooth member being pivotally disposed in each corresponding recess, the rotary tooth member being swingable, whereby one end of the rotary tooth member can be engaged with or disengage from the engagement teeth, the elastic member being disposed in each recess.

11. The one-way inertial rotational device as claimed in claim 1, wherein at least one recess is disposed on the first circumferential face, the one-way transmission tooth being a ratchet member, the ratchet member being disposed and movable in each corresponding recess, whereby one end of the ratchet member can be engaged with or disengage from the engagement teeth, the elastic member being disposed in each recess.

12. The one-way inertial rotational device as claimed in claim 2, wherein at least one recess is disposed on the first circumferential face, the one-way transmission tooth being a ratchet member, the ratchet member being disposed and movable in each corresponding recess, whereby one end of the ratchet member can be engaged with or disengage from the engagement teeth, the elastic member being disposed in each recess.

13. The one-way inertial rotational device as claimed in claim 3, wherein at least one recess is disposed on the first circumferential face, the one-way transmission tooth being a ratchet member, the ratchet member being disposed and movable in each corresponding recess, whereby one end of the ratchet member can be engaged with or disengage from the engagement teeth, the elastic member being disposed in each recess.

14. The one-way inertial rotational device as claimed in claim 4, wherein at least one recess is disposed on the first circumferential face, the one-way transmission tooth being a ratchet member, the ratchet member being disposed and movable in each corresponding recess, whereby one end of the ratchet member can be engaged with or disengage from the engagement teeth, the elastic member being disposed in each recess.

15. The one-way inertial rotational device as claimed in claim 1, wherein the first circumferential face is the circumference of the rotary seat, while the second circumferential face is the pivot hole of the inertial member, or the first circumferential face is the pivot hole of the inertial member, while the second circumferential face is the circumference of the rotary seat.

16. The one-way inertial rotational device as claimed in claim 2, wherein the first circumferential face is the circumference of the rotary seat, while the second circumferential face is the pivot hole of the inertial member, or the first circumferential face is the pivot hole of the inertial member, while the second circumferential face is the circumference of the rotary seat.

17. The one-way inertial rotational device as claimed in claim 3, wherein the first circumferential face is the circumference of the rotary seat, while the second circumferential face is the pivot hole of the inertial member, or the first circumferential face is the pivot hole of the inertial member, while the second circumferential face is the circumference of the rotary seat.

18. The one-way inertial rotational device as claimed in claim 4, wherein the first circumferential face is the circumference of the rotary seat, while the second circumferential face is the pivot hole of the inertial member, or the first circumferential face is the pivot hole of the inertial member, while the second circumferential face is the circumference of the rotary seat.

* * * * *